(12) United States Patent
Bynoe et al.

(10) Patent No.: US 9,578,351 B1
(45) Date of Patent: Feb. 21, 2017

(54) GENERATING VISUALIZATIONS FOR DISPLAY ALONG WITH VIDEO CONTENT

(71) Applicant: Accenture Global Services Limited, Dublin (IE)

(72) Inventors: Joseph Bynoe, San Francisco, CA (US); Kelvin Michael, Toronto (CA)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 14/839,438

(22) Filed: Aug. 28, 2015

(51) Int. Cl.
*H04N 21/2187* (2011.01)
*H04N 21/234* (2011.01)
*H04N 21/431* (2011.01)
*H04N 21/488* (2011.01)
*G06F 17/30* (2006.01)

(52) U.S. Cl.
CPC .. *H04N 21/23424* (2013.01); *G06F 17/30241* (2013.01); *H04N 21/2187* (2013.01); *H04N 21/4312* (2013.01); *H04N 21/4888* (2013.01)

(58) Field of Classification Search
CPC ..................... H04N 21/23424; H04N 21/2187; H04N 21/4312; H04N 21/4888; G06F 17/30241
See application file for complete search history.

(56) References Cited

U.S. PATENT DOCUMENTS

| | | | |
|---|---|---|---|
| 6,088,064 A | 7/2000 | Rumreich et al. | |
| 6,578,077 B1 | 6/2003 | Rakoshitz et al. | |
| 8,239,538 B2 | 8/2012 | Zhang et al. | |
| 8,396,807 B1 | 3/2013 | Yemini et al. | |
| 8,463,900 B2 | 6/2013 | Dasgupta et al. | |
| 8,464,255 B2 | 6/2013 | Nathuji et al. | |
| 8,538,389 B1* | 9/2013 | Evans | H04L 67/18 345/156 |
| 8,707,300 B2 | 4/2014 | Govindan et al. | |
| 8,909,785 B2 | 12/2014 | Franco et al. | |
| 2003/0158930 A1 | 8/2003 | McBride | |
| 2004/0063484 A1* | 4/2004 | Dreaper | G07F 17/3288 463/16 |
| 2005/0160423 A1 | 7/2005 | Bantz et al. | |
| 2006/0036743 A1 | 2/2006 | Deng et al. | |
| 2007/0143796 A1 | 6/2007 | Malik | |

(Continued)

OTHER PUBLICATIONS

Sampai, Altino and Barbosa, Jorge G., "Last-Level Cache Interference-Aware Scheduling in Scientific Clouds," Parallel & Cloud Computing—PCC vol. 2, Issue 4, pp. 116-125, www.vikingpub.com.

(Continued)

*Primary Examiner* — Randy Flynn
(74) *Attorney, Agent, or Firm* — Brinks Gilson & Lione (57) ABSTRACT

A method and system for generating visualizations for display synchronized with related video content are provided. The system includes memory comprising geocoded data and a communications interface to transmit video content to a display device. A visualization circuitry in communication with the communications interface is configured to receive a video signal, develop secondary data to be displayed according to the received video signal, select a subset of the geocoded data according to the video signal, and generate a user interface for the display device to display the secondary data, a physical representation of the selected geocoded data and the video content together.

20 Claims, 6 Drawing Sheets

(56) References Cited

U.S. PATENT DOCUMENTS

| | | |
|---|---|---|
| 2007/0279494 A1 | 12/2007 | Aman et al. |
| 2008/0019603 A1 | 1/2008 | Rahmes et al. |
| 2008/0154837 A1 | 6/2008 | Morimura et al. |
| 2009/0063995 A1* | 3/2009 | Baron .............. H04N 21/25866 715/753 |
| 2009/0085915 A1 | 4/2009 | Kelley et al. |
| 2009/0189982 A1* | 7/2009 | Tawiah .................. H04N 7/181 348/157 |
| 2009/0241108 A1 | 9/2009 | Edwards et al. |
| 2009/0262137 A1* | 10/2009 | Walker .................. H04H 60/04 345/629 |
| 2009/0312103 A1* | 12/2009 | Chen ........................ G07F 17/32 463/41 |
| 2010/0069035 A1 | 3/2010 | Johnson |
| 2010/0080163 A1* | 4/2010 | Krishnamoorthi ... H04N 21/482 370/312 |
| 2010/0205602 A1 | 8/2010 | Zedlewski et al. |
| 2011/0013087 A1 | 1/2011 | House et al. |
| 2011/0043652 A1* | 2/2011 | King .................. G06F 17/2211 348/222.1 |
| 2011/0082935 A1 | 4/2011 | Zetterman et al. |
| 2011/0099195 A1* | 4/2011 | Patwardhan ........ G06F 17/3084 707/769 |
| 2011/0131307 A1 | 6/2011 | El Bazzal et al. |
| 2011/0153805 A1 | 6/2011 | Beninghaus et al. |
| 2011/0173214 A1* | 7/2011 | Karim .................. G06F 17/3002 707/754 |
| 2011/0302578 A1 | 12/2011 | Isci et al. |
| 2012/0094639 A1 | 4/2012 | Carlson et al. |
| 2012/0179432 A1 | 7/2012 | Wivell et al. |
| 2013/0047178 A1* | 2/2013 | Moon ................ H04N 21/4627 725/25 |
| 2013/0151712 A1 | 6/2013 | O'Sullivan et al. |
| 2014/0059635 A1* | 2/2014 | Sirpal ................ H04N 21/4858 725/131 |
| 2014/0189734 A1* | 7/2014 | Anguiano .......... H04N 21/4668 725/35 |
| 2014/0195019 A1 | 7/2014 | Thurman et al. |
| 2014/0258539 A1 | 9/2014 | Heninger et al. |
| 2015/0379767 A1 | 12/2015 | Inoue et al. |

OTHER PUBLICATIONS

International Search Report and Written Opinion mailed Sep. 4, 2014 for PCT Application No. PCT/US2014/031600 (5 pp.).

Final Office Action dated Nov. 1, 2016 for U.S. Appl. No. 14/223,312 (34 pp.).

Patent Examination Report No. 2 dated Oct. 13, 2016 for Australian Patent Application No. 2014235873 (5 pp.).

Patent Examination Report No. 1 dated Oct. 17, 2016 for Australian Patent Application No. 2016219607 (7 pp.).

Patent Examination Report No. 1 dated Sep. 22, 2016 for Australian Patent Application No. 2016206330 (5 pp.).

"Aggregating Data to Grid Cells," *Spatial Python*, http://sites.google.com/site/spatialpython/aggregating-data-to-grid_cells, printed on Nov. 18, 2016 (7 pp.).

Beshai, Peter, "Buckets: Basketball Shot Visualization," University of British Columbia, published Dec. 2014, https://www.cs.ubc.ca/~tmm/courses/547-14/projects/peter/report.pdf (19 pp.).

Buja, Andreas et al., "Linear Smoothing and Additive Models," *The Annals of Statistics*, 1989, vol. 17, No. 2, 453-510 (58 pp.).

"Football Matchday Widget Showcase," Opta Sports, https://web.archive.org/web/20130901042706/http://www.optasports.com/football-matchday-widget-showcase.aspx (4 pp).

Knutson, Ted, "Visualizing Eden Hazard," https://thechels.co.uk/4717-visualizing-eden-hazard/, Feb. 2, 2014 (6 pp.).

"2012 Matrix," Opta Sports, https://web.archive.org/web/20130420075948/http://www.optasports.com/ImageGen.ashx?image=/media/456902/media.jpg&width=646&height=294 (1 pp.).

* cited by examiner

GENERATING VISUALIZATIONS FOR DISPLAY ALONG WITH VIDEO CONTENT

FIELD OF THE TECHNOLOGY

The disclosure relates to the field of video content display, and more particularly, it relates to a system and method for generating visualizations for display along with video content.

BACKGROUND OF THE TECHNOLOGY

The video content may be displayed in a user interface of a display device. The rapid advances in technology have resulted in computing devices with continually increasing data processing capability. The advanced data processing technology may be used to manipulate the video content displayed to enhance the video to be played in the display device.

SUMMARY

Examples of the present disclosure provide at least a visualization system and a method for generating visualizations for display along with video content.

In one embodiment, the present disclosure provides a visualization system that may include a memory storing geocoded data, a communications interface for delivering a streaming video, and visualization circuitry in communication with the memory and the communications interface. The visualization circuitry may be configured to receive a streaming video signal, develop a commentary message to be displayed according to the received streaming video signal, access the geocoded data from the memory, select a subset of the geocoded data according to the streaming video signal, generate a user interface having a first area adjacent to a second area adjacent to a third area, process the streaming video signal to generate a streaming video display in the first area of the user interface, process the selected subset of geocoded data to generate a display of a physical representation of the selected subset of geocoded data in an area map in the second area of the user interface, where said display of the physical representation of the selected subset of geocoded data may be synchronized with the streaming video display, process the commentary message to generate a display of the commentary message in the third area of the user interface that is synchronized with the streaming video display, and transmit to display devices via the communications interface the user interface including the streaming video display in the first area of the user interface, the synchronized geocoded data display in the area map in the second area of the user interface, and the synchronized commentary message display in the third area of the user interface.

In another embodiment, the present disclosure provides a visualization method that may include storing geocoded data into a memory, delivering a streaming video via a communications interface, and receiving by visualization circuitry a streaming video signal from the memory. The method may also include developing by the visualization circuitry a commentary message to be displayed according to the received streaming video signal, accessing by the visualization circuitry the geocoded data from the memory, selecting by the visualization circuitry a subset of the geocoded data according to the streaming video signal, generating by the visualization circuitry a user interface having a first area adjacent to a second area adjacent to a third area, processing by the visualization circuitry the streaming video signal to generate a streaming video display in the first area of the user interface, processing by the visualization circuitry the selected subset of geocoded data to generate a display of a physical representation of the selected subset of geocoded data in an area map in the second area of the user interface, wherein said display of the physical representation of the selected subset of geocoded data may be synchronized with the streaming video display, processing by the visualization circuitry the commentary message to generate a display of the commentary message in the third area of the user interface that is synchronized with the streaming video display, and transmitting to display devices via the communications interface the user interface including the streaming video display in the first area of the user interface, the synchronized geocoded data display in the area map in the second area of the user interface, and the synchronized commentary message display in the third area of the user interface.

BRIEF DESCRIPTION OF THE DRAWINGS

The system and/or method may be better understood with reference to the following figures and descriptions. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION OF ILLUSTRATED EXAMPLES

The purpose, technical proposal and advantages in the examples of the present disclosure will be clear and complete from the following detailed description when taken in conjunction with the appended drawings. The examples described herein are merely a part of examples of the present disclosure, not all examples. Persons skilled in the art may obtain all other examples without creative works, based on these examples.

The video content may be displayed in a display device. One example of the video content is the streaming video content. The streaming video may be received and presented to an end-user while the content of streaming video is still delivering by a provider. The streaming video may be different from downloading as the streaming video starts to play before the entire video file has been transmitted.

Sports activities constitute a major part of the streaming videos. People enjoy watching sports via streaming video, sometimes, the live streaming video. The streaming video may be a live broadcasting. The streaming video may also be a replay of stored video from a previously played TV program. In general, commentators' voice comment on the sports games may be part of the streaming video. However, the advanced data processing technology may be able to capture live play-by-play data and provide the data analysis and develop the automatic commentary to be displayed along with the streaming video. For example, the play-by-play data may be geocoded and the data may be transformed and stored in a database. A computer program or circuitry may be developed to retrieved the geocoded play-by-play data from the database and develop the data analysis and commentary for the streaming video, and the developed data analysis and commentary may also be displayed together with the streaming video in a user interface of a display device.

Figure 1:
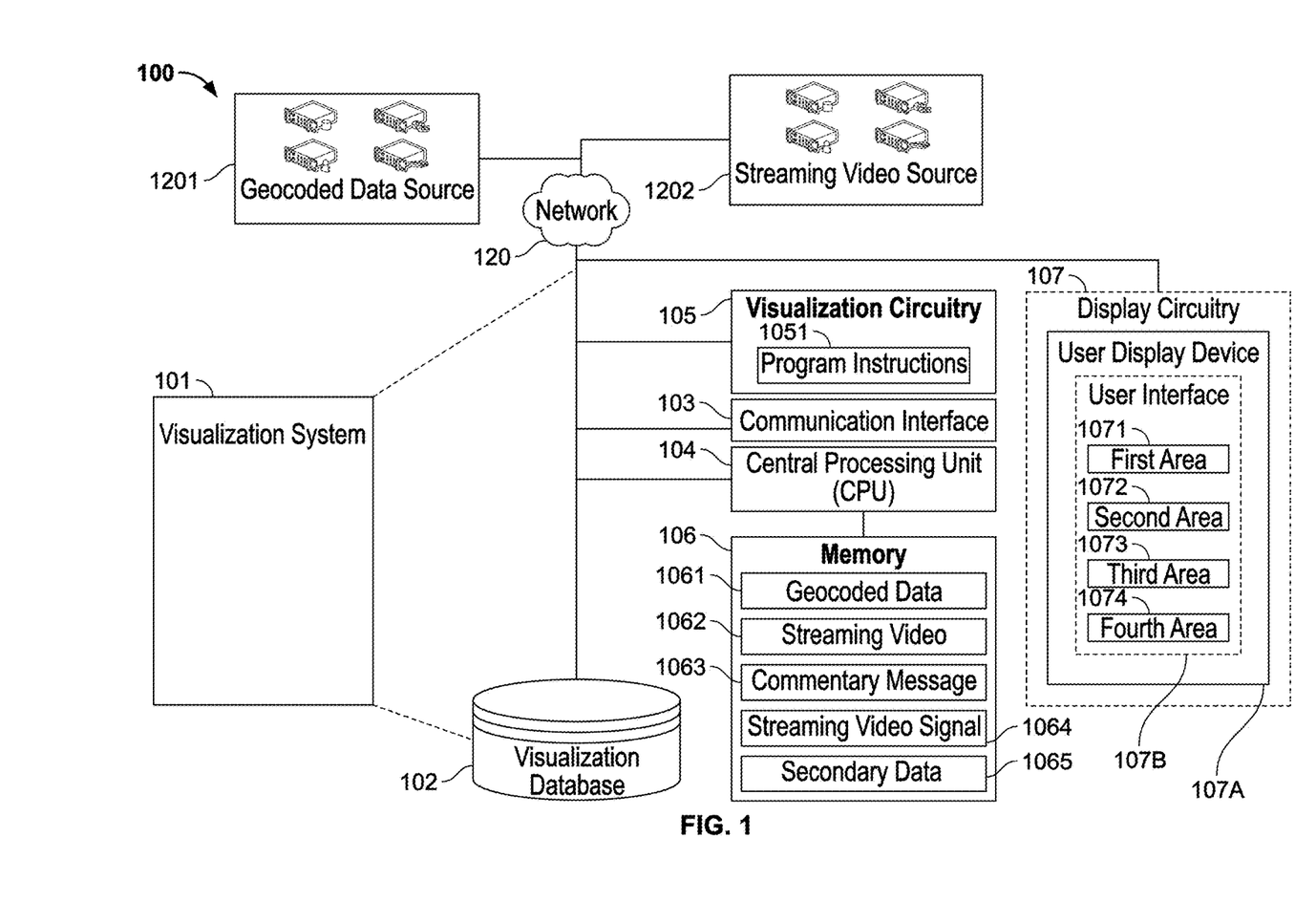
FIG. 1 shows an example system diagram that depicts the visualization system for generating visualizations for display along with video content.

FIG. 1 shows an example system diagram that depicts the visualization system for generating visualizations for display along with video content 100. As shown in FIG. 1, a visualization system 101 may include a memory 106 where geocoded data 1061 is stored therein. The geocoded data 1061 may be received from geocoded data source 1201 via network 120.

There may be several geocoded data sources 1201. One of the geocoded data sources may be sports data providers. The sports data providers may provide statistics for a sports game such as a hockey game. Such statistics may include conference, division, games, teams, broadcast providers, addresses of the game, coaches, profiles of players, game time, events of the game such as: shots, assists, goals, hits, penalties, etc. The statistics may also include X and Y coordinates of the events of the game. As such, the geographical location of the sports events for a sports game may be obtained. Each geocoded data record obtained may have a timestamp to indicate when the data record is captured and stored.

As in FIG. 1, the visualization system 101 may include a display circuitry 107 to develop display for a display device 107A. The display device may display a streaming video that may be received from the streaming video source 1202 via the network 120. The layout of the display for the streaming video in the display device 107A may be generated by the display circuitry 107. As shown in FIG. 1, the display circuitry 107 may work together with visualization circuitry 105. The display circuitry 107 may generate the display layout to be displayed in the user interface 107A of the user display device 107A. The visualization circuitry 105 may retrieve the streaming video 1062 from the memory and generate streaming video signal 1064 and other contents to be displayed. For example, visualization circuitry 105 may select geocoded data 1061, generate commentary message 1063 and secondary data 1065 to be displayed in the user interface 107B.

The user interface 107B may include multiple areas. According to FIG. 1, the user interface 107B may include a first area 1071, a second area 1072, a third area 1073 and a fourth area 1074. The display areas may be generated by the display circuitry 107 and each display area may display different contents which the data for the contents may be developed by visualization circuitry 105. Even though four areas are shown in FIG. 1, it's possible to display more or less number of areas in the user interface 107B.

The visualization circuitry 105 of the system 100 as shown in FIG. 1 may be in communication with the memory 106, the communication interface 103 and CPU 104. The visualization circuitry 105 may communicate with display circuitry 107 to generate data to be displayed in display device 107A. The visualization circuitry 105 may include program instructions 1051. The visualization circuitry 105 may be configured by using the program instructions 1051 executed by CPU 103. The visualization circuitry 105 may receive a streaming video 1062 from the streaming video source 1202 via the communication interface 103. The stream video 1062 may be stored in the memory 106. The streaming video signal 1064 may be generated by the visualization circuitry 105 to use the content of streaming video 1062 stored in the memory 106. The streaming video signal 1064 may be the signal that causes the display device 107A to display the streaming video.

The visualization circuitry 105 may also develop a commentary message 1063 to be displayed according to the streaming video signal 1064. For example, in a hockey game, when the stream video signal 1064 may cause the user display device 107A to display a specific play (such as a shot or a goal), a commentary message 1063 may be developed to comment on the specific play. Such commentary message 1063 may be in plain English. For example, a streaming video signal 1064 may enable the display device 107A to display one player score a goal. According to this streaming video signal 1064, the visualization circuitry 105 may develop a commentary message 1063 and may be displayed as: "Goal!!!" The developed commentary message 1063 may also be stored in the memory 106.

The visualization circuitry 105 may develop the commentary message 1063 by using speech-to-text data. For example, the streaming video signal 1064 may include an audio portion. The visualization circuitry 105 may extract the audio portion from the streaming video signal 1064, and process the audio portion to generate speech-to-text data. The generated speech-to-text data may be used to develop the commentary message 1063 by adding additional comments. Sometimes, the generated speech-to-text data may be good enough to be used as the commentary message 1063.

The visualization circuitry 105 may also use the received geocoded data 1061 stored in the memory 106 to develop the commentary message 1063. For example, the visualization circuitry 105 may read the received geocoded data 1061 that may or may not be stored in the memory 106 and filter received geocoded data 1061 and obtain historical play statistics for the team Montreal to play against the goalie James. The visualization circuitry 105 may then determine that the team Montreal has the best scoring opportunity when the goalie James is pressured at the net. Furthermore, the visualization circuitry 105 may invoke a natural language conversion function to convert the determined result regarding the team Montreal and goalie James to a natural language commentary message 1063. For example, the determined result may be converted to the natural language: "Montreal has been most successful again James when pressuring him right at the net."

Sometimes, some text comments may be provided in the geocoded data 1061, the generation of commentary message 1063 may be to extract the text comments included in the geocoded data 1061. For example, if the player John has the best shooting record in a hockey league, the text comment "John is the best shooter in league A" may be included in the received the geocoded data 1061 for John when he plays a hockey game. Thus, this text comment may be extracted from the received geocoded data 1061 and may be used for developing the commentary message 1063.

For the live streaming video, the commentary message 1063 may be developed at real-time while the streaming video of the game is playing. The commentary message 1063 may not be limited to the text message. The commentary message 1063 may also be images, or chart or video that may be used to reflect an opinion for the display of the streaming video signal 1064.

The visualization circuitry 105 may select the geocoded data 1061 according to the streaming video signal 1064. According to FIG. 1, the visualization circuitry 105 may access the geocoded data 1061, select a subset of the geocoded data 1061 according to the streaming video signal 1064. The geocoded data 1061 received from geocoded data resource 1201 may include various data. For example, the geocoded data 1061 for a sports game may include conference, division, games, teams, broadcast providers, addresses of the game, coaches, profiles of players, game time, events of the game such as: shots, assists, goals, hits, penalties, and X and Y coordinates of the events of the game, etc. The geocoded data 1061 needed to generate commentary message or secondary data to be displayed may only be a subset of various data. Also, the received geocoded data 1061 may be for a long period of time and may be for many sports games, while the streaming video signal 1064 displayed may be a particular game at a particular time. As such, the visualization circuitry 105 may select a subset of the geocoded data 1061 that is related to the streaming video signal 1064 displayed (or to be displayed) in the user interface 107A.

The visualization circuitry 105 may select the geocoded data 1061 according to the time of the video content to be displayed. For example, for on-demand streaming video or replay, the on demand videos may be cut and pieced together leading to a different video than the original live version. For example, the commercials may need to be taken out. The original live video may be spliced. Thus, the time of video may be calculated. For example, at a hockey game, an event that occurred at the 10th minute of the 1st period would map to the 35th minute of the video. Therefore, the visualization circuitry may be configured to curate a file that lists the game clock time at different points in the streaming video. The visualization circuitry may develop a time for the streaming video to be displayed and select the subset of the geocoded data based on the developed time and a timestamp embedded in the geocoded data. Because each geocoded data record may have a timestamp, the geocoded data may thus be selected for the video to be played according to its time. The selected geocoded data may be further filtered by the visualizations. For example, in a hockey game, visualizations of the shot distribution, hit distribution, assists and shot wheel may require different geocoded data. The selected geocoded data by using the timestamp may be further filtered by the required data for visualizations to be generated.

However, there may be no need to calculate the time for the live streaming video. The geocoded data for the live video may be generated and may be received from the geocode data sources almost at the same time as the live video streaming data may be received and played. Thus, the geocoded data may not need to be selected according to the time of live streaming video. However, the geocoded data may still be subject to be selected according to other criteria such as activities criteria, geographic criteria, etc.

The visualization circuitry 105 may also use the speech-to-text data extracted from the audio of the video to select a subset of the geocoded data 1061. For example, the visualization circuitry 105 may process the audio portion to determine keywords according to the speech-to-text data from the audio portion of the streaming video signal 1064. The visualization circuitry 105 may select a subset of the geocoded data 1061 by using the determined keywords. By this way, the selected subset of the geocoded data 1061 may relate to the streaming video 1062 to be displayed in the user interface 107B.

Table 1 shows examples of NLP keywords. As shown in Table 1, the geocoded data for shot distribution visualization may be selected by using keywords miss, save, blocked, shot, goal, on target, etc. Geocoded data for other visualizations may also be selected using the keywords.

TABLE 1

| Visualization | Keywords |
| --- | --- |
| Shot Distribution | Miss, save, blocked, shot, goal, on target |
| Hit Distribution | Hit, check |
| Assists | Assist, pass |
| Shot Wheel | Miss, save, blocked, shot, goal, on target |

One of the implementation of the user interface 107B may be to generate the user interface 107B by the display circuitry 107 to display a first area 1071 adjacent to a second area 1072 adjacent to a third area 1073. The visualization circuitry 105 may process the streaming video signal 1064 to generate a display for the streaming video signal 1064 to be displayed in the first area 1071. The visualization circuitry 105 may process the selected subset of geocoded data 1061 to generate a display of a physical representation of the selected subset of geocoded data 1061 as an area map to be displayed in the second area 1072. For example, in hockey game, the shot data may be display as a hexagon in the area map that mimics a hockey playing rink. The commentary message 1063 may be displayed in the third area 1073.

As the original streaming video may be displayed in the whole area of the user interface 107B. The displayed video content may need to be resized to fit into the first area 1071. When the sizes different areas are changed, the video content may also be resized. Other contents to be displayed in different areas of the user interface 107B may need to be resized as well.

The visualization circuitry 105 may synchronize the display of the selected subset of geocoded data 1061 with the display of the streaming video signal 1064. The selected subset of geocoded data to be displayed may match the streaming video signal to be displayed. For example, in a sports game, the commentary message 1063 displayed may match the game that is displayed.

The visualization circuitry 105 may also update the commentary message 1063 and the secondary data. For example, as a sports game advances, the data analysis and commentary message for the sports game may need to be updated according to the latest game play. When a player moves, the display of the selected subset of geocoded data may be updated according to the movement of the player. Thus, the display of the selected subset of geocoded data may be updated according to the display of the streaming video signal 1064.

The video time and speech to text conversion may be used for both data synchronization and update. For example, the determined streaming video time and the timestamp in the geocoded data may be used for the display synchronization and data updates for on-demand video and replay. The keywords from the speech to text analysis may also be used for the display synchronization and data updates.

The displayable format for the selected subset of geocoded data 1061 may be determined by the visualization circuitry 105 and the visualization circuitry 105 may convert the selected geocoded data 1061 to the determined displayable format. For example, a shot chart format for the selected geocoded data having shot data may be displayed in an area map for a hockey game for the selected players. In the shot chart, when a player in the streaming video is playing and is displaying in a first area 1071, the shot chart for the player may be displayed as an area map in a second area 1072 by using the selected geocoded data 1061 for the player. Such first area 1071 and the second area 1072 may be separate areas of one user interface 107B in the display device 107A. Both the streaming video signal 1064 for the hockey game and the display of a shot chart for the selected geocoded data 1061 may be presented in one user interface 107B of the display device 107A at the same time.

Other displayable formats for the selected geocoded data 1061 may also be developed. For example, other than a shot chart, a text shot statistics may be developed. The shots in the shot chart may further be displayed in different manners. For example, a shot may be displayed as a dot or an arrow, and a shot area may be a box or a hexagon in an area map that may mimic the hockey playing rink.

In addition, secondary data 1065 may be developed by using the selected geocoded data 1061 and may be stored in the memory 106. For example, in a hockey game, shot accuracy data may be developed by using the shot data. The shot accuracy may be calculated by counting the number of shots on target plus the number of goals and dividing by the total number of shots in a specific area (a hexagon area in the area map for example). The developed secondary data 1065 may also be displayed in the user interface 107B. The secondary data may be displayed in the fourth area 1074 of the user interface 107B. The secondary data may also be displayed along with the display of the geocoded data 1061.

The developed data and its display in the fourth area 1074 of the user interface 107B may change when the selected geocoded data 1061 is changed according to the streaming video signal 1064. For example, in a hockey game, when a player moves from one area to another area in the ice rink, the shot accuracy for the player may not be the same. As such, the shot accuracy may be re-calculated as the player is moving from one area to another in the hockey ice rink. The display for the shot accuracy in the fourth area 1074 may change according to the movement of the player.

The visualization circuitry 105 and/or display circuitry 107 may further process the commentary message 1063 to generate a display for the commentary message 1063. The commentary message 1063 may be synchronized with the streaming video signal 1064. The display of the commentary message 1063 may be a text message, or an image or a video. The commentary message 1063 may be displayed in the third area 1073 of the user interface 107B.

The visualization circuitry 105 may be configured to transmit data for the user interface 107B to display devices 107A via the communications interface 103. The transmitted data may include the streaming video display in the first area 1071 of the user interface 107B, the synchronized geocoded data display in the area map in the second area 1072, and the synchronized commentary message display in the third area 1073.

The visualization circuitry 105 and/or display circuitry 107 may be configured to display the streaming video 1062 in the first area 1071, the selected geocoded data 1061 in the second area 1072, commentary message 1063 in the third area 1073 and the secondary data 1065 in the fourth area 1074. All of data may be displayed in different areas of the user interface 107B of the display device 107A at the same time. As such, the viewers may view all information at once.

Different number of display areas may be developed. For example, there may be three display areas (without the fourth area) rather than four display areas. Also, the number of display areas may change during the play of the video content. For example, in a hockey game, the number of areas may be developed according to the progress of the game. Sometimes, the selected geocoded data may be displayed in two or more areas, sometimes, the commentary message may not be necessary for display. As such, the number of display areas may change. Also, different sports games may require different displays. Thus, the ordinary skilled person in the art may develop various variations.

In addition, the system 100 may not be implemented only for streaming video display. For example, the visualization circuitry 105 and/or display circuitry 107 may generate a display according to received geocoded data 1061 according to a display of any video content in a user interface 107B of a display device 107A. The display of the geocoded data 1051 may relate to the display of the video content. The visualization circuitry 105 and/or display circuitry 107 may combine the display for the geocoded data 1061 and the display of the video content and display them in different areas of the user interface 107B. The commentary message 1063 and/or secondary data 1065 disclosed above may also be developed and displayed. The video content for the system 100 may be a live broadcasting TV or a video game.

Sometimes, the data used may not be geocoded. For example, when a video content is displayed, the system may display added contents along with the video content in one user interface. The added contents may be generated by using data that may not be geocoded. As in a hockey game, the added contents may be generated by using the historical statistical data without X and Y coordinates. Thus, the data used may not be geocoded. As another example for the system 100, the commentary message and/or the secondary data may not be necessary to be generated and displayed.

Figure 2:
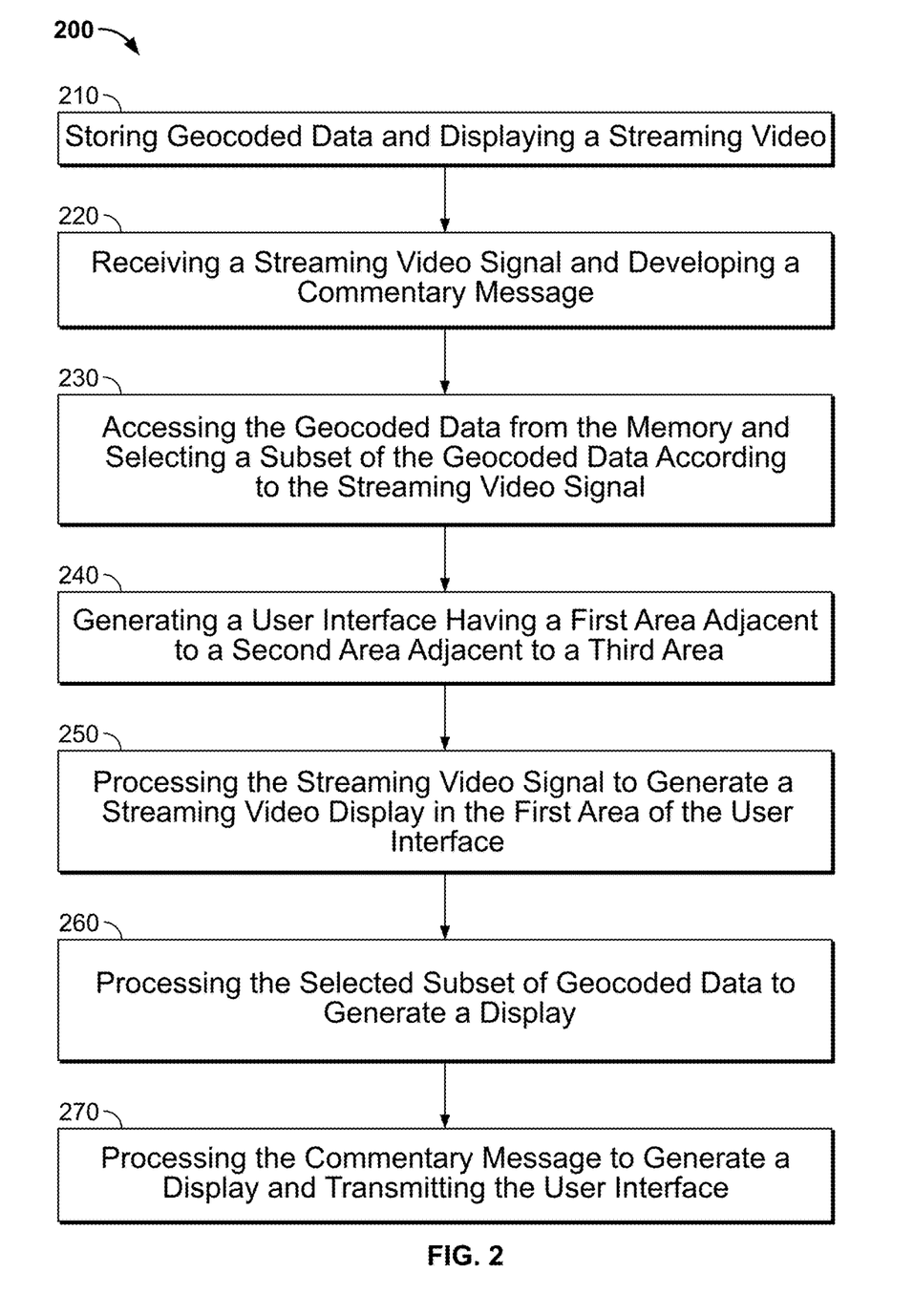
FIG. 2 illustrates an example of high level logic flow of the visualization method for generating visualizations for display along with video content.

FIG. 2 illustrates an example of high level logic flow of the visualization method for generating visualizations for display along with video content 200.

The logic 200 may include storing geocoded data into a memory, and displaying a streaming video in a display device (Step 210). During this step, the geocoded data may be received from external sources and may be stored in a memory. The memory may be either transitory or non-transitory. Step 210 may include delivering a streaming video via a communications interface. The streaming video may be from external servers. The streaming video may be live broadcasting sports games or replay of historical sports games or on demand video or any other contents. The display device may be stationary or portable. The display device that is used to display the streaming video may be any device that may be used to display streaming video or any video content.

The logic 200 may include receiving a streaming video signal from the memory, and developing a commentary message to be displayed according to the received streaming video signal (Step 220). The logic 200 may also include accessing the geocoded data from the memory, and selecting a subset of the geocoded data according to the streaming video signal (Step 230). As such, the developed commentary message, the selected subset of geocoded data and the streaming video signal may be correlated. The correlation may be done by matching the timestamp of the geocoded data record with the calculated time for the streaming video for on demand video, or by extracting audio from the video content and develop keywords to match the geocoded data. As another example implementation, the commentary message may not be necessary. The logic 200 may not implement the Step 220.

Logic 200 may include generating a user interface having a first area adjacent to a second area adjacent to a third area (step 240), and processing the streaming video signal to generate a streaming video display in the first area of the user interface (Step 250), processing the selected subset of geocoded data to generate a display of a physical representation of the selected subset of geocoded data in an area map in the second area of the user interface, where said display of the physical representation of the selected subset of geocoded data may be synchronized with the streaming video display (Step 260), and processing the commentary message to generate a display of the commentary message in the third area of the user interface that is synchronized with the streaming video display, and transmitting to display devices via the communications interface the user interface comprising the streaming video display in the first area of the user interface, the synchronized geocoded data display in the area map in the second area of the user interface, and the synchronized commentary message display in the third area of the user interface (Step 270).

The commentary message may not be generated. When the commentary message is not generated, a third area in the user interface may or may not be necessary. Furthermore, the geocoded data may be replaced by other data that may be associated with the video display. The streaming video display may also be any other video content display such as downloaded video, a TV broadcasting and/or video game, etc.

In Logic 200, the received streaming video signal may include an audio portion, and the audio portion may be extracted from the streaming video signal, and speech-to-text data may be generated by processing the audio portion. The commentary message may be developed to be displayed according to the speech-to-text data from the audio portion of the streaming video signal. Keywords may be determined by processing the audio portion. The subset of the geocoded data may be selected according to the determined keywords in the audio portion of the streaming video signal. In logic 200, the commentary message may be processed to generate the display of a textual commentary message in the third area of the user interface.

The streaming video in logic 200 may include a sports game, and the selected subset of geocoded data may be associated with the sports game, and the commentary message may be developed to comment the sports game based on the selected subset of geocoded data.

In logic 200, shot accuracy data may be developed based on the selected subset of geocoded data to predict an outcome of the sports game, and the shot accuracy data may be calculated by counting a number of shots on target plus a number of goals and dividing by the total number of shots for an area of the second area. An accuracy display may be developed based on the shot accuracy data, and the shot accuracy data may be displayed in a fourth area of the user interface of the display device.

In logic 200, the streaming video displayed in the display device may be a live video stream. The live video stream may be a popular video content display in the user interface of a display device. According to logic 200, live sports game, live music performance or any other live video stream may be displayed in the display device by adding the display of additional contents in the same user interface. The added display may have contents that are associated with the live video stream.

In logic 200, a file that lists the game clock time at different points in the streaming video may be curated, and a time for the streaming video to be displayed may be developed, and the subset of the geocoded data may be selected based on the developed time and a timestamp embedded in the geocoded data.

For live streaming video, the time match between the geocoded data and the time of streaming video may not be necessary. When the video is a live streaming, the geocoded data for the live game may be generated and be obtained immediately. For example, play by play data for a hockey game may be generated and be able for downloading almost at the same time when the live streaming video is obtained and is played at the user interface. As such, the obtained geocoded data may be in sync with the live streaming video and no additional synchronization may be needed.

Further, in logic 200, the streaming video display may be resized whenever there is a change for the first area of the user interface. Because the original streaming video may be designed to fit the whole the user interface and the current disclosure may only display the streaming video in one area of the user interface, the streaming video may be resized to fit into this one area in the user interface. Furthermore, when there is a change in size of the area for displaying the streaming video, the streaming video display may need to be resized as well. In addition, the display for other areas in the user interface may also be resized.

Figure 3A:
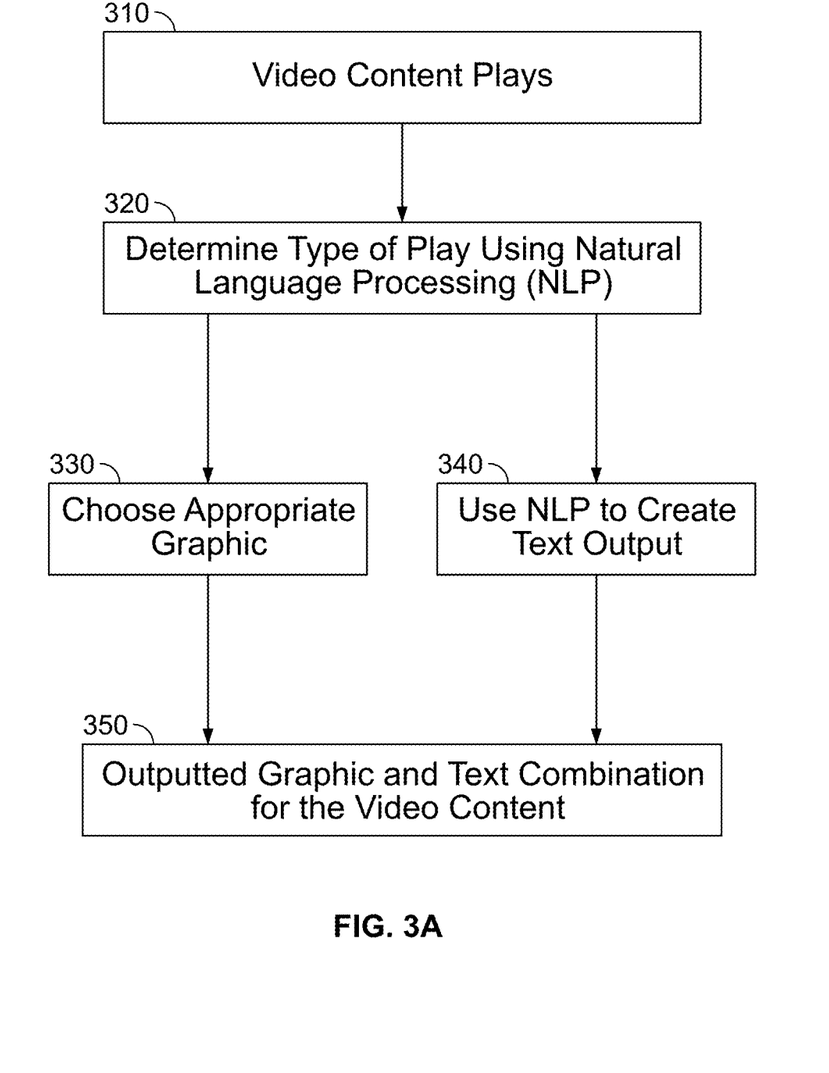
FIGS. 3A-3B illustrate system processing diagrams for generating visualizations.
Figure 3B:
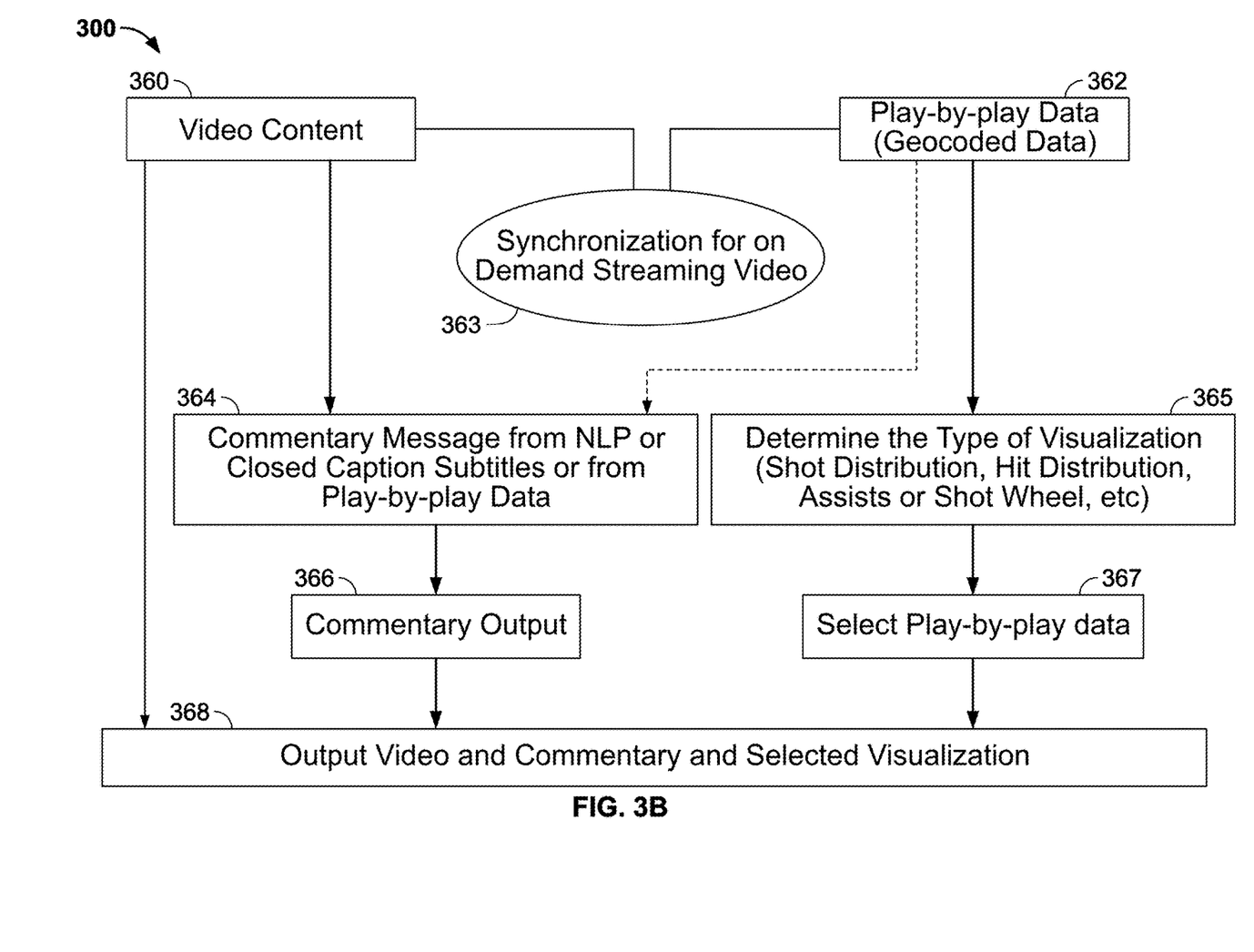

FIGS. 3A-3B illustrate system processing diagrams for generating visualizations 300. As shown in FIG. 3A, a video content may be played 310 in a display device. The process 300 may determine type of play using a natural language processing (NLP) 320. According to FIG. 3A, the process 300 may not know the video to be displayed in advance. The process 300 may detect the audio to be played in the video content, and determine the content that is playing or to be played by using NLP. After the type of play is determined 320, the process 300 may choose the appropriate graphic to be displayed along with the video content. The chosen graphic 330 may be displayed together with the video content in one user interface of the display device.

The chosen graphic 330 may be displayed separately from the video content. For example, the chosen graphic 330 may be displayed in a user interface that is different from the user interface that displays the video content. The chosen graphic 330 may also be displayed in a different display device from the display device that displays the video content. The different display devices may be located in one location. The different display devices may be located remotely from one to another.

As shown in FIG. 3A, the process 300 may create text output by using NLP 340. The created text output 340 may relate to the video content to be played. The created text output 340 may be a commentary message in a sports game. Alternatively, the created text output 340 may not relate to the video content to be played. For example, the create text output 340 may remind the viewer for an important meeting to go to or an incoming phone call from someone while a live sports game is playing.

The process 300 may generate outputted graphic and text combination for the video content 350. The combined output 350 may replace the original video content and may be played in the same display device for the original video content. Alternatively, the combined output 350 including the chosen graphic 330, the generated text 340 and video content 310 may display in a display device that may be different from the display device for the video content 310.

FIG. 3B may illustrate an example of the system process diagram for a hockey game. As shown in FIG. 3B, the video content 360 may provide the source of video to be played, and play-by-play data 362 may be one type of the geocoded data that may be obtained from the geocoded source. When video content 360 is an on demand video or replay, the synchronization 363 between the video content 360 and play-by-play data 362 may be needed. The time for video content may be calculated by using the video content files and the calculated video content time may be used for matching the timestamp in the play-by-play data. There may be no need for synchronization for live streaming video because the live streaming video and the play-by-play data may arrive almost at the same time.

In FIG. 3B, the commentary message may be created from NLP 364 by using the video content as shown in FIG. 3A, the commentary message may also be created by extracting from closed caption subtitles or may be created from play by play data 362. The commentary output 366 may be a text output or may be image, chart or any other format to display the commentary message 364.

As shown in FIG. 3B, the obtained play-by-play data 362 may be selected 367 after the type of visualization is determined 365. The type of visualizations may include shot distribution, hit distribution, assists or shot wheel, etc. 365. The play-by-play data may be filtered by selecting a subset of the obtained data 367 by using the determined visualization. The find output may include the output of video content, commentary and the selected visualization 368.

Figure 4:
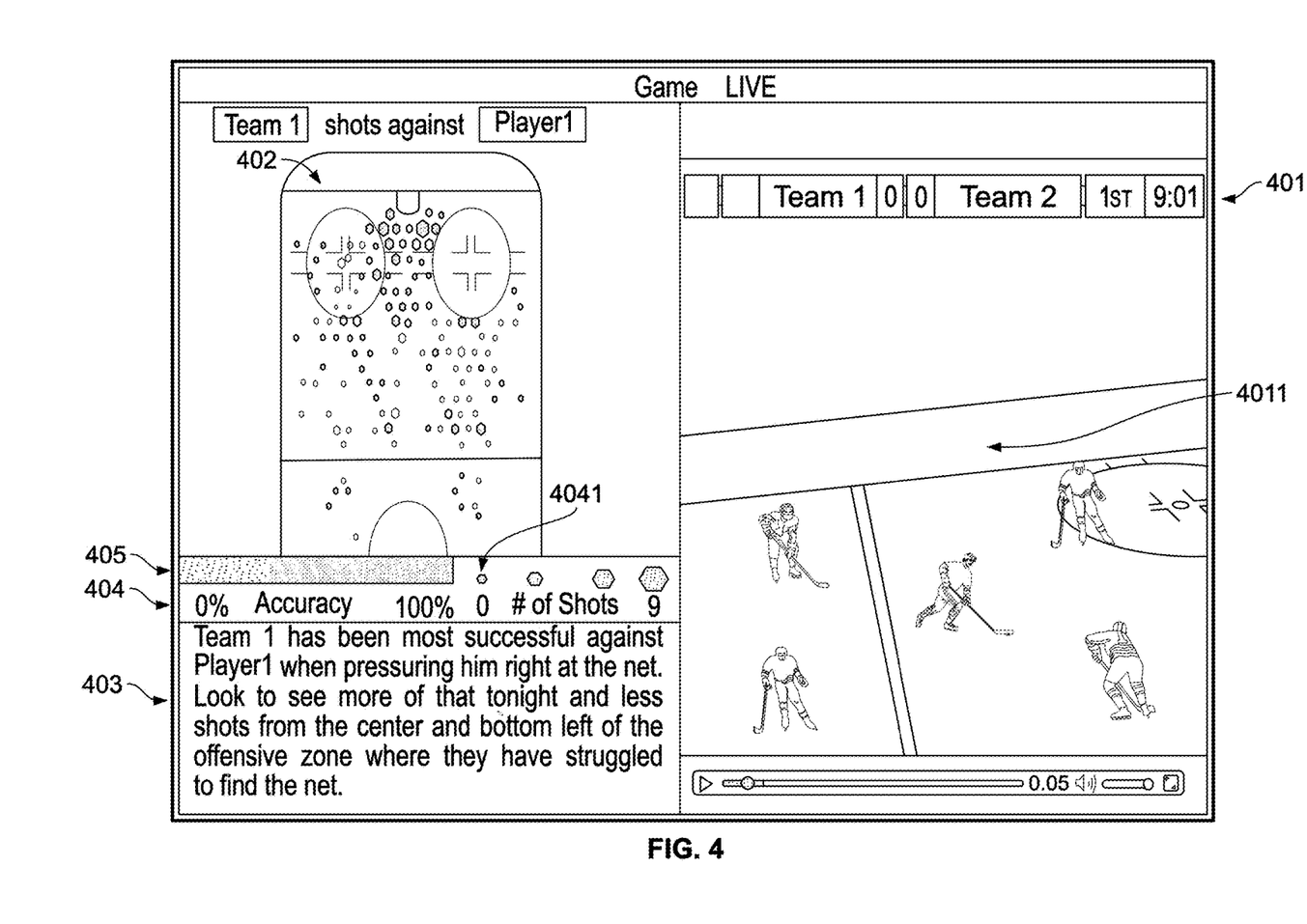
FIG. 4 illustrates an example of user interface of the display device for generated visualization.

FIG. 4 illustrates an example of user interface of the display device for generated visualization 400. As shown in FIG. 4, a live video (or on demand video) for a hockey game is playing in one display area 401 of the user interface 400, and the user interface 400 shows a shot chart visualization in an area map that mimic the hockey playing rink in a second area 402. The shot chart may graphically display the shot statistics for the hockey team. Examples of other visualizations that may be displayed in the second area 402, such as listed above in Table 1, are illustrated in co-pending application Ser. No. 14/839,032, entitled "Generating Interactively Mapped Data Visualizations," to inventor Joseph Bynoe, filed on Aug. 28, 2015, which is incorporated by reference in its entirety herein. The user interface 400 also shows a commentary message in an area 403 that may be different from the display area to show the game 401 and the area to show the shot map 402. As shown in FIG. 4, the fourth area 404 may show the percentage range for shot accuracy. The area 405 shows a grey level that represents the percentage of shot accuracy from 0% to 100%. The size of hexagon 4041 is to represent the number of shots in the area map that is also displayed in the fourth area 404. It should be understood that video signals and corresponding graphical visualizations of sports other than hockey may be shown using the systems and methods disclosed herein.

Figure 5:
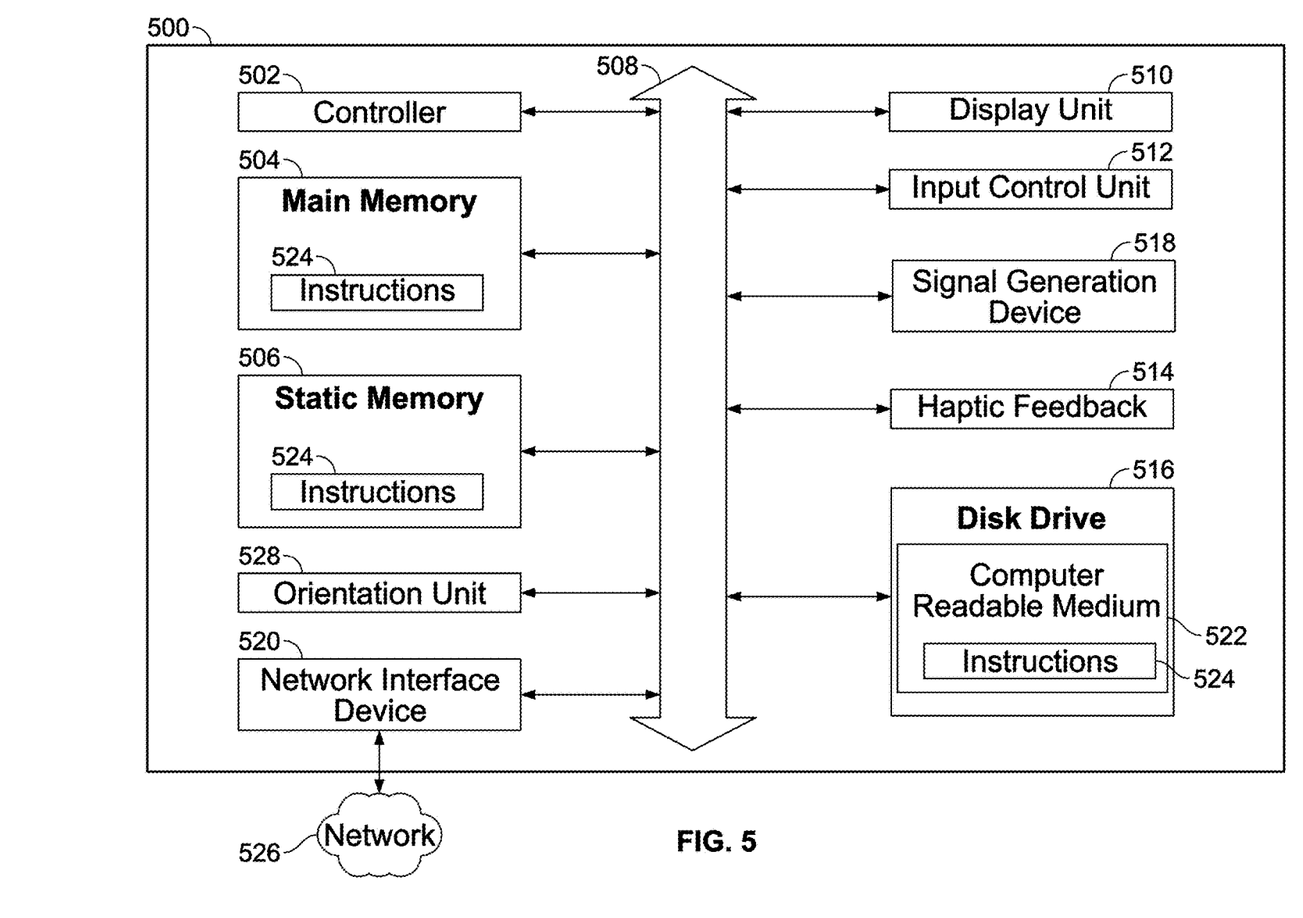
FIG. 5 illustrates an example of a computer system that may be used for generating visualizations.

FIG. 5 illustrates an example of a computer system that may be used for generating visualizations. The computer system 500 may include an orientation unit 528 that includes any combination of one or more gyroscope(s) and accelerometer(s).

The computer system 500 may also include a network interface device 520 to allow the computer system 500 to communicate via wireless, or wired, communication channels with other devices. The network interface device 520 may be an interface for communicating with another computer system via a Wi-Fi connection, Bluetooth connection, Near Frequency Communication connection, telecommunications connection, internet connection, wired Ethernet connection, or the like. The computer system 500 may also optionally include a disk drive unit 516 for accepting a computer readable medium 522. The computer readable medium 522 may include a set of instructions that are executable by the controller 502, and/or the computer readable medium 522 may be utilized by the computer system 500 as additional memory storage.

In a particular embodiment, as depicted in FIG. 5, the disk drive unit 516 may include a computer-readable medium 522 in which one or more sets of instructions 524, such as software, can be embedded. Further, the instructions 524 may embody one or more of the methods, processes, or logic as described herein. In a particular embodiment, the instructions 524 may reside completely, or at least partially, within the main memory 504, the static memory 506, and/or within the controller 502 during execution by the computer system 500. The main memory 504 and the controller 502 also may include computer-readable media.

In an alternative embodiment, dedicated hardware implementations, including application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present computer system 2600 may encompass software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 522 that includes instructions 524 or receives and executes instructions 524 responsive to a propagated signal; so that a device connected to a network 526 can communicate voice, video or data over the network 526. Further, the instructions 524 may be transmitted or received over the network 526 via the network interface device 520.

While the computer-readable medium 524 is shown to be a single medium, the term "computer-readable medium" includes a single medium or multiple media, such as a centralized or distributed database, and/or associated caches and servers that store one or more sets of instructions. The term "computer-readable medium" shall also include any tangible medium that is capable of storing, encoding or carrying a set of instructions for execution by a processor or that cause a computer system to perform any one or more of the methods or operations disclosed herein.

In a particular non-limiting, exemplary embodiment, the computer-readable medium 522 can include a solid-state memory such as a memory card or other package that houses one or more non-volatile read-only memories, such as flash memory. Further, the computer-readable medium 522 can be a random access memory or other volatile re-writable memory. Additionally, the computer-readable medium 522 can include a magneto-optical or optical medium, such as a disk or tapes or other storage device to capture information communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium 522 or a distribution medium and other equivalents and successor media, in which data or instructions may be stored. The computer readable medium may be either transitory or non-transitory.

Although the present specification describes components and functions that may be implemented in particular embodiments with reference to particular standards and protocols commonly used by video content display, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The principles described herein may be embodied in many different forms. Not all of the depicted components may be required, however, and some implementations may include additional components. Variations in the arrangement and type of the components may be made without departing from the spirit or scope of the claims as set forth herein. Additional, different or fewer components may be provided.

Reference throughout this specification to "one example," "an example," "examples," "one embodiment," "an embodiment," "example embodiment," or the like in the singular or plural means that one or more particular features, structures, or characteristics described in connection with an embodiment or an example is included in at least one embodiment or one example of the present disclosure. Thus, the appearances of the phrases "in one embodiment," "in an embodiment," "in an example embodiment," "in one example," "in an example," or the like in the singular or plural in various places throughout this specification are not necessarily all referring to the same embodiment or a single embodiment. Furthermore, the particular features, structures, or characteristics may be combined in any suitable manner in one or more embodiments or examples.

The terminology used in the description herein is for the purpose of describing particular examples only and is not intended to be limiting. As used herein, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

The exemplary environment may include a server, a client, and a communication network. The server and the client may be coupled through the communication network for information exchange, such as sending/receiving identification information, sending/receiving data files such as splash screen images, etc. Although only one client and one server are shown in the environment, any number of terminals or servers may be included, and other devices may also be included.

The described communication between devices may include any appropriate type of communication network for providing network connections to the server and client or among multiple servers or clients. For example, communication network may include the Internet or other types of computer networks or telecommunication networks, either wired or wireless. In embodiments, the disclosed methods and apparatus may be implemented, for example, in a wireless network that includes at least one client.

In some cases, the client may refer to any appropriate user terminal with certain computing capabilities, such as a personal computer (PC), a work station computer, a server computer, a hand-held computing device (tablet), a smart phone or mobile phone, or any other user-side computing device. In various embodiments, the client may include a network access device. The client may be stationary or mobile.

A server, as used herein, may refer to one or more server computers configured to provide certain server functionalities, such as database management and search engines. A server may also include one or more processors to execute computer programs in parallel.

It should be noticed that, the embodiments/examples and the features in the embodiments/examples may be combined with each other in a no conflict condition. The inventive aspects will become apparent from the detailed description when taken in conjunction with the accompanying drawings.

It should be noticed that, the steps illustrated in the flowchart of the drawings may be performed in a set of computer devices using executable program code. And the order of the steps may be different from that in the drawings under some status, although an example logic order is shown in the flowchart.

It is to be understood that, all examples provided above are merely some of the preferred examples of the present disclosure. For one skilled in the art, the present disclosure is intended to cover various modifications and equivalent arrangements included within the principle of the disclosure.

The invention claimed is:

1. A visualization system comprising:
a memory storing geocoded data;
a communications interface for delivering a streaming video;
visualization circuitry in communication with the memory and the communications interface,
the visualization circuitry configured to:
receive a streaming video signal;
develop commentary messages to be displayed according to real-time content or a timeline of the received streaming video signal;
access the geocoded data from the memory;
select subsets of the geocoded data according to the real-time content or the timeline of the streaming video signal;
generate a user interface having a first area adjacent to a second area adjacent to a third area;
process the streaming video signal to generate a streaming video display in the first area of the user interface;
process the selected subsets of geocoded data to generate a display of a physical representation of the selected subsets of geocoded data in an area map in the second area of the user interface, said display of the physical representation of the selected subsets of geocoded data being synchronized with the streaming video display by time or content of the streaming video;
process the commentary messages to generate a display of the commentary messages in the third area of the user interface that is synchronized for simultaneously display matching with the streaming video display by time or content of the streaming video; and transmit to display devices via the communications interface the user interface comprising the streaming video display in the first area of the user interface, the synchronized geocoded data display in the area map in the second area of the user interface, and the synchronized commentary messages display in the third area of the user interface.

2. The system of claim 1, wherein the visualization circuitry is configured to receive the streaming video signal comprising an audio portion, extract the audio portion from the streaming video signal, process the audio portion to generate real-time speech-to-text data, develop the commentary messages to be displayed according to the speech-to-text data from the audio portion of the streaming video signal, process the audio portion to determine keywords, and select the subsets of the geocoded data according to the determined keywords in the audio portion of the streaming video signal; and wherein the display of the physical representation of the selected subsets of geocoded data in the second area and display of commentary messages in the third area are synchronized with the streaming video by the real-time speech-to-text data.

3. The system of claim 1, wherein the visualization circuitry is configured to curate a file that lists the game clock time at different points in the streaming video and develop a time for the streaming video to be displayed and select the subsets of the geocoded data based on the developed time and a timestamp embedded in the geocoded data.

4. The system of claim 1, wherein the visualization circuitry is configured to process the commentary messages to generate the display of a textual commentary messages in the third area of the user interface.

5. The system of claim 1, wherein the streaming video comprises a sports game, the selected subsets of geocoded data are associated with the sports game, and the commentary messages are developed to comment the sports game based on the selected subsets of geocoded data.

6. The system of claim 1, wherein the visualization circuitry is configured to develop shot accuracy data based on the selected subsets of geocoded data to predict an outcome of the sports game.

7. The system of claim 6, wherein the shot accuracy data is calculated by counting a number of shots on target plus a number of goals and dividing by the total number of shots for an area of the second area.

8. The system of claim 7, wherein the visualization circuitry is configured to develop an accuracy display based on the shot accuracy data and display the accuracy display in a fourth area of the user interface.

9. The system of claim 1, wherein the visualization circuitry is configured to resize the streaming video display whenever there is a change for the first area of the user interface.

10. The system of claim 1, wherein the streaming video displayed in the user interface is a live video stream.

11. A visualization method comprising:
storing geocoded data into a memory;
delivering a streaming video via a communications interface;
receiving, by visualization circuitry, a streaming video signal from the memory;

developing, by the visualization circuitry, commentary messages to be displayed according to real-time content or a timeline of the received streaming video signal;
accessing, by the visualization circuitry, the geocoded data from the memory;
selecting, by the visualization circuitry, subsets of the geocoded data according to the real-time content or the timeline of the streaming video signal;
generating, by the visualization circuitry, a user interface having a first area adjacent to a second area adjacent to a third area;
processing, by the visualization circuitry, the streaming video signal to generate a streaming video display in the first area of the user interface;
processing, by the visualization circuitry, the selected subsets of geocoded data to generate a display of a physical representation of the selected subsets of geocoded data in an area map in the second area of the user interface, said display of the physical representation of the selected subsets of geocoded data being synchronized with the streaming video display;
processing, by the visualization circuitry, the commentary messages to generate a display of the commentary messages in the third area of the user interface that is synchronized for simultaneous display matching by time or content with the streaming video display; and
transmitting to display devices via the communications interface the user interface comprising the streaming video display in the first area of the user interface, the synchronized geocoded data display in the area map in the second area of the user interface, and the synchronized commentary messages display in the third area of the user interface.

12. The method of claim 11, wherein the received streaming video signal comprises an audio portion, the audio portion is extracted from the streaming video signal, and speech-to-text data is generated by processing the audio portion, wherein the commentary messages are developed to be displayed according to the speech-to-text data from the audio portion of the streaming video signal, keywords are determined by processing the audio portion, and the subsets of the geocoded data are selected according to the determined keywords in the audio portion of the streaming video signal; and wherein the display of the physical representation of the selected subsets of geocoded data in the second area and display of commentary messages in the third area are synchronized with the streaming video by the real-time speech-to-text data.

13. The method of claim 11, wherein a file that lists the game clock time at different points in the streaming video is curated and a time for the streaming video to be displayed is developed and the subsets of the geocoded data is selected based on the developed time and a timestamp embedded in the geocoded data.

14. The method of claim 11, wherein the commentary messages is processed to generate the display of a textual commentary messages in the third area of the user interface.

15. The method of claim 11, wherein the streaming video comprises a sports game, the selected subsets of geocoded data are associated with the sports game, and the commentary messages are developed to comment the sports game based on the selected subsets of geocoded data.

16. The method of claim 11, wherein shot accuracy data is developed based on the selected subsets of geocoded data to predict an outcome of the sports game.

17. The method of claim 16, wherein the shot accuracy data is calculated by counting a number of shots on target plus a number of goals and dividing by the total number of shots for an area of the second area.

18. The method of claim 17, wherein an accuracy display is developed based on the shot accuracy data is displayed in a fourth area of the user interface.

19. The method of claim 11, wherein the streaming video display is resized whenever there is a change for the first area of the user interface.

20. The method of claim 11, wherein the streaming video displayed in the user interface is a live video stream.

\* \* \* \* \*